United States Patent
Froigneux

(10) Patent No.: US 12,066,615 B2
(45) Date of Patent: Aug. 20, 2024

(54) APPARATUS AND METHOD FOR LIGHT-BEAM SCANNING MICROSPECTROMETRY

(71) Applicant: HORIBA FRANCE SAS, Palaiseau (FR)

(72) Inventor: Emmanuel Froigneux, Villeuneuve D'ascq (FR)

(73) Assignee: HORIBA FRANCE SAS, Palaiseau (FR)

( * ) Notice: Subject to any disclaimer, the term of this patent is extended or adjusted under 35 U.S.C. 154(b) by 569 days.

(21) Appl. No.: 17/415,425

(22) PCT Filed: Dec. 18, 2019

(86) PCT No.: PCT/FR2019/053162
§ 371 (c)(1),
(2) Date: Jun. 17, 2021

(87) PCT Pub. No.: WO2020/128333
PCT Pub. Date: Jun. 25, 2020

(65) Prior Publication Data
US 2022/0075170 A1 Mar. 10, 2022

(30) Foreign Application Priority Data
Dec. 21, 2018 (FR) ...................................... 1873992

(51) Int. Cl.
*G02B 21/00* (2006.01)
(52) U.S. Cl.
CPC ..... *G02B 21/0048* (2013.01); *G02B 21/0032* (2013.01); *G02B 21/006* (2013.01); *G02B 21/0076* (2013.01)
(58) Field of Classification Search
CPC ............ G02B 21/0048; G02B 21/0032; G02B 21/006; G02B 21/0076; G02B 21/00;
(Continued)

(56) References Cited

U.S. PATENT DOCUMENTS 6,654,164 B1 * 11/2003 Wilczynski ........ G02B 17/0804
359/857
2005/0128476 A1 6/2005 Zhao
(Continued)

FOREIGN PATENT DOCUMENTS

EP 1 983 332 10/2008
EP 3605185 A1 2/2020
(Continued)

OTHER PUBLICATIONS

Sasian, "Double-curvature surfaces in mirror system design", Optical Engineering, Jan. 1, 1997, vol. 36, No. 1, p. 183-188.
(Continued)

*Primary Examiner* — Arnel C Lavarias
(74) *Attorney, Agent, or Firm* — NIXON & VANDERHYE

(57) ABSTRACT

An apparatus for light-beam scanning microscopy includes a microscope objective and a movement system for moving an excitation light beam. The movement system for moving the excitation light beam includes a first focusing optical component suitable for focusing the excitation light beam in an intermediate focal plane, another focusing optical component suitable for forming an image of the intermediate focal in a focal plane of the microscope objective and a single scanning mirror arranged between the first optical component and the intermediate focal plane, the scanning mirror being mounted on a stage, the orientation of which can be adjusted, so as to move the image of the focusing point in two transverse directions in the object focal plane or in the image focal plane of the microscope objective.

20 Claims, 4 Drawing Sheets

Figure 1:
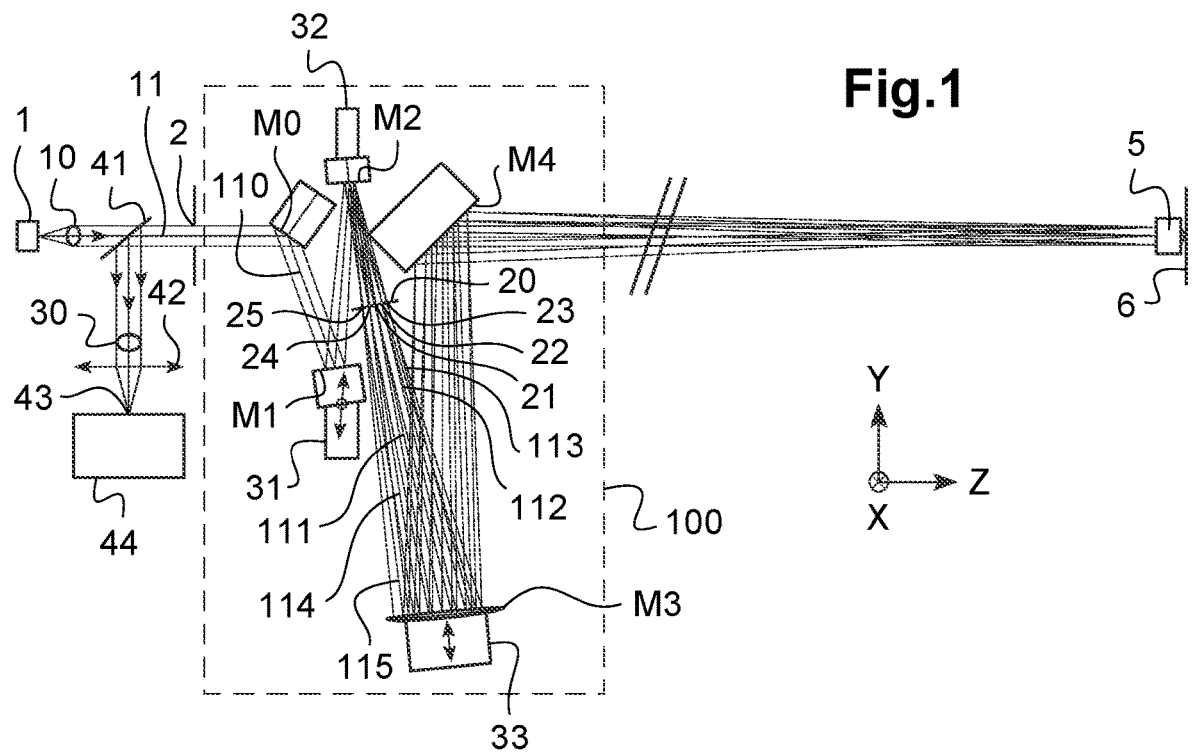

(58) Field of Classification Search
CPC .............. G02B 21/0004; G02B 21/002; G02B 21/0024; G02B 21/0036; G02B 21/06; G02B 21/36; G02B 21/361; G01J 3/00; G01J 3/02; G01J 3/0205; G01J 3/0208; G01J 3/021; G01J 3/0291; G01J 2003/064
USPC ....... 359/385, 362, 363, 364, 368, 369, 379, 359/388, 389, 390; 356/300, 326, 311, 356/317, 318
See application file for complete search history.

(56) References Cited

U.S. PATENT DOCUMENTS

| | | | |
|---|---|---|---|
| 2006/0012891 | A1 | 1/2006 | Goelles et al. |
| 2012/0140240 | A1* | 6/2012 | Hillman ............. G01N 21/4795 356/496 |
| 2013/0182250 | A1* | 7/2013 | McClure ............... G01J 3/2823 356/302 |
| 2013/0188034 | A1* | 7/2013 | Juette ..................... G02B 13/14 250/353 |
| 2017/0082597 | A1 | 3/2017 | Matsumoto et al. |
| 2018/0283939 | A1 | 10/2018 | Krishnamachari |

FOREIGN PATENT DOCUMENTS

| | | |
|---|---|---|
| JP | 2001-91848 | 4/2001 |
| JP | 2007163448 A | 6/2007 |
| JP | 2010091809 A | 4/2010 |
| JP | 2013019908 A | 1/2013 |
| JP | 2013156408 A | 8/2013 |
| JP | 2015219502 A | 12/2015 |
| JP | 2017215546 A | 12/2017 |
| JP | 2018151598 A | 9/2018 |
| JP | 2018531424 A | 10/2018 |
| WO | 2010/069987 | 6/2010 |
| WO | 2011/047911 | 4/2011 |
| WO | 2015/159035 | 10/2015 |
| WO | 2018/089865 | 5/2018 |
| WO | 2018179946 A1 | 10/2018 |
| WO | WO-2021058939 A1 * | 4/2021 ......... G02B 21/0032 |

OTHER PUBLICATIONS

Boulanger et al., "Fast high-resolution 3D total internal reflection fluorescence microscopy by incidence angle scanning and azimuthal averaging", Proceedings of the National Academy of Sciences (PNAS), Dec. 2, 2014, vol. 111, No. 48, pp. 17164-17169.
Office Action issued in Japanese Patent Application No. 2021-532376 dated Jul. 12, 2023.
International Search Report for PCT/FR2019/053162 dated May 14, 2020, 7 pages.
Written Opinion of the ISA for PCT/FR2019/053162 dated May 14, 2020, 7 pages.
Sasian, "Double-curvature surfaces in mirror system design", Optical Engineering, Jan. 1, 1997, vol. 36, No. 1, p. 183 (submission pending).
Boulanger et al., "Fast high-resolution 3D total internal reflection fluorescence microscopy by incidence angle scanning and azimuthal averaging", Proceedings of the National Academy of Sciences (PNAS), Nov. 17, 2014, vol. 111, No. 48, pp. 17164-17169 (submission pending).

* cited by examiner

APPARATUS AND METHOD FOR LIGHT-BEAM SCANNING MICROSPECTROMETRY

CROSS-REFERENCE TO RELATED APPLICATIONS

This application is the U.S. national phase of International Application No. PCT/FR2019/053162 filed Dec. 18, 2019 which designated the U.S. and claims priority to FR 1873992 filed Dec. 21, 2018, the entire contents of each of which are hereby incorporated by reference.

The present invention generally relates to the field of micro-spectrometry devices and methods in which an excitation light beam is positioned or moved on a sample through a microscope objective and in which a light beam formed by scattering and/or reflection on the sample is collected to be spectrally analysed.

It more particularly relates to laser-beam scanning Raman micro-spectrometry device and method. It also relates to a total internal reflection fluorescence microscopy device and method.

It is known in particular from document EP1983332A a spectroscopic imaging method and a system for exploring a sample by beam scanning. More precisely, document EP1983332A describes a scanning device placed in the tube of a confocal microscope in such a way as to be inserted between the microscope objective and the injection-rejection filter of a Raman spectrometer. The scanning device includes two galvanometric mirrors arranged in series on the optical path of a laser beam. The two galvanometric mirrors have axes of rotation that are transverse to each other to angularly move the laser beam along orthogonal directions on the surface of the sample. The two-mirror optical system makes it possible to angularly move the excitation laser beam in such a way as to position it at different points of the sample surface. By inverse return of light, this two-mirror optical system makes it possible to collect a Raman back-scattering beam in order to transmit it towards a detection system comprising a Raman spectrometer. The advantage of this two-galvanometric mirror system is that the laser source and the detection system remain fixed. This device makes it possible to acquire by Raman spectrometry an image of a portion of the surface of a sample with a resolution of about 50×50 points within about ten minutes.

Other patent documents describe beam-scanning microscopy devices (see, for example, WO 2010/069987, US 2005/128476 or JP 2001 091848).

Document WO 2015/159035 A1 describes another light-beam scanning or light-beam angular movement microscopy device and method comprising at least one first mirror and one second mirror arranged in series on an optical path of a light beam between a light source and a microscope objective, the first mirror being tilted according to a first predetermined angle of rotation and the second mirror being tilted according to a second angle of rotation in such a way as to pivot the axis of the light beam about the centre of the microscope objective pupil. This system makes it possible to increase the beam scanning area on the sample, without vignetting effect. By inverse return of light, this system makes it possible to collect a significant Raman flow. However, this system requires a synchronization between the tilting of the first mirror and of the second mirror arranged in series and is relatively expensive.

One of the objects of the invention is to propose an excitation laser-beam movement or scanning micro-spectrometry device and method, wherein the scanning system is simple and cheap, while making it possible to scan a spatially and/or angularly extended area on the sample.

Another object of the invention is to increase the spatial extend of the measurement field without modifying the spatial resolution of the measurements or the quality of the measurements.

Another object of the invention is to improve the quality of the Raman or fluorescence micro-spectrometry measurements.

Another object of the invention is to reduce the duration of acquisition of the Raman or fluorescence micro-spectrometry measurements acquired at a determined point of a sample or by scanning of an area of a sample.

In order to remedy the above-mentioned drawbacks of the state of the art, the present invention proposes a light-beam scanning micro-spectrometry device comprising at least one light source adapted to emit an excitation light beam, a microscope objective arranged along a main optical axis of the micro-spectrometry device, the microscope objective having an object focal plane and an image focal plane, a system for moving the excitation light beam along two spatial directions (X, Y) transverse to the optical axis of the beam, the microscope objective and the movement system being adapted to move the excitation light beam on a sample, an optical system adapted to collect a light beam formed by reflection, scattering and/or transmission of the excitation light beam on the sample and a spectrometric detection system adapted to receive the light beam formed by reflection, scattering and/or transmission.

More particularly, it is proposed according to the invention an excitation light beam movement system comprising a first focusing optical component adapted to receive and focus the excitation light beam to a focusing point in an intermediate focal plane, another focusing optical component arranged on an optical path of the beam between the intermediate focal plane and the microscope objective, the other focusing optical component being adapted to form an image of the intermediate focal plane in the object focal plane or, respectively, in the image focal plane of the microscope objective, and a single scanning mirror arranged on the optical path of the excitation light beam between the first focusing optical component and the intermediate focal plane, the scanning mirror being planar and mounted on a stage rotatable about two transverse axes of rotation, the two axes of rotation being in the plane of the scanning mirror, the scanning mirror being adapted to move the focusing point along two transverse directions in the intermediate focal plane in such a way as to move the image of the focusing point along two transverse directions in the object focal plane or, respectively, in the image focal plane of the microscope objective.

Other non-limitative and advantageous features of the light-beam scanning micro-spectrometry device according to the invention, taken individually or according to all the technically possible combinations, are the following:

- the first focusing optical component is a toric mirror;
- the first toric-mirror focusing optical component is adapted to reduce geometrical optical aberrations in the intermediate focal plane;
- the first focusing optical component includes at least one lens;
- the first focusing optical component is mounted on a guiding rail adapted to adjust the distance between the first focusing optical component and the microscope objective;
- the other focusing optical component is a spherical mirror, a toric mirror or a lens;

the other focusing optical component is mounted on another guiding rail adapted to adjust the distance between the other focusing optical component and the microscope objective;

the scanning mirror is arranged to receive the excitation light beam under an angle of incidence lower than or equal to 15 degrees;

the device further includes a first planar deflecting mirror and/or another planar reflecting mirror, the first planar reflecting mirror being arranged upstream from the first focusing optical component and/or, respectively, the other planar reflecting mirror being arranged between the other focusing optical component and the microscope objective;

the rotatable stage includes a two-axis-of-rotation actuator of the piezoelectric or voice coil type;

said at least one light source comprises one or several sources of the laser source and/or light-emitting diode type;

the micro-spectrometry device includes a confocal aperture arranged upstream of the first focusing optical component, the excitation light beam incident on the first focusing optical component being collimated;

the spectrometric detection system includes a Raman spectrometer, a coherent anti-Stokes Raman spectrometer, a fluorescence spectrometer, a photoluminescence spectrometer, a cathodoluminescence spectrometer, a hyperspectral camera, a spectral filter or a tunable bandpass filter;

the spectrometric detection system is adapted to measure and analyse the light beam formed by reflection, scattering and/or transmission as a function of a movement of the excitation light beam on the sample;

the microscope objective is a total internal reflection objective and the other focusing optical component is adapted to form an image of the intermediate focal plane in the object focal plane of the total internal reflection objective, in such a way as to angularly move the collimated excitation light beam in the image focal plane and to collect a total internal reflection light beam on the sample.

The invention also proposes a method of light-beam scanning micro-spectrometry comprising the following steps: emitting an excitation light beam by means of a light source; directing the excitation light beam towards a first focusing optical component and reflecting the excitation light beam on a single planar scanning mirror, in such a way as to focus the excitation light beam to a focusing point in an intermediate focal plane after reflection of the excitation light beam on the scanning mirror, directing the excitation light beam towards another focusing optical component then a microscope objective, in such a way as to form an image of the intermediate focal plane in the object focal plane or, respectively, in the image focal plane of the microscope objective, and tilting the scanning mirror about two transverse axes of rotation to move the focusing point along two transverse directions in the intermediate focal plane, in such a way as to move the image of the focusing point along two transverse directions in the object focal plane or, respectively, in the image focal plane of the microscope objective in such a way as to form an excitation light beam at a determined point or, respectively, under a determined angle of incidence in the image plane of the microscope objective; collecting a light beam formed by reflection, scattering and/or transmission of the excitation light beam, and receiving the light beam formed by reflection, scattering and/or transmission on a spectrometric detection system.

The excitation light beam movement system and method according to the invention make it possible to position and/or to scan the position or the tilt of the excitation light beam in the front focal plane of a microscope objective. The movement system is based on a single and same scanning mirror. This system is simpler, faster and cheaper than the systems of the prior art based on at least two scanning mirrors arranged in series. Moreover, this movement system offers an alternative solution to solve the beam vignetting problem during the beam scanning.

The system and method of the invention are compatible for spectrometry measurements by reflection, transmission, back or front scattering.

Of course, the different features, alternatives and embodiments of the invention can be associated with each other according to various combinations, insofar as they are not incompatible with each other or exclusive from each other.

Figure 2:
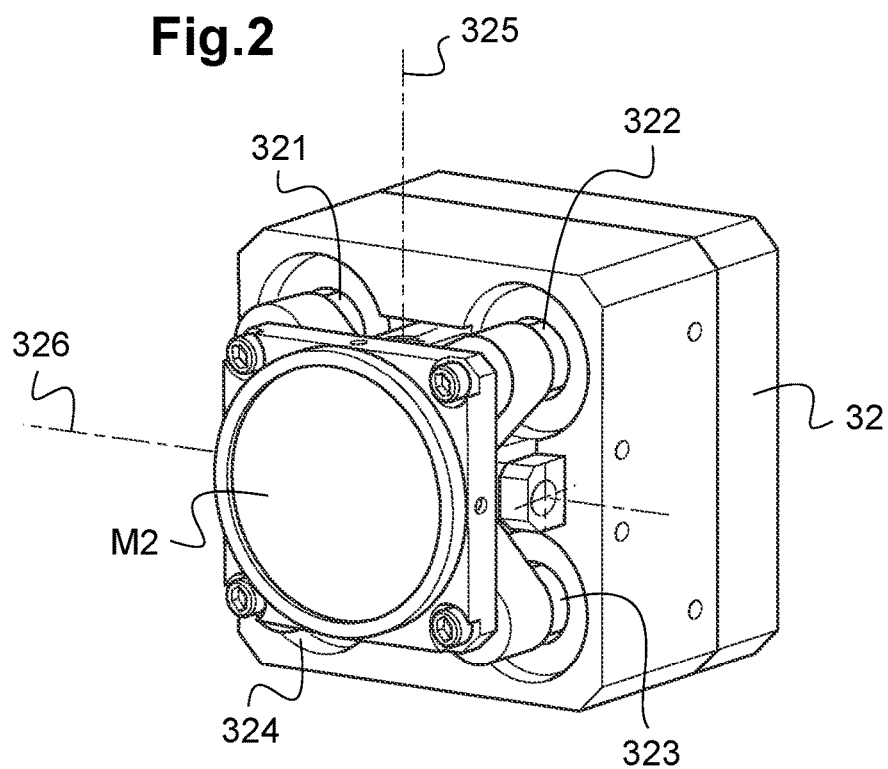
Figure 3:
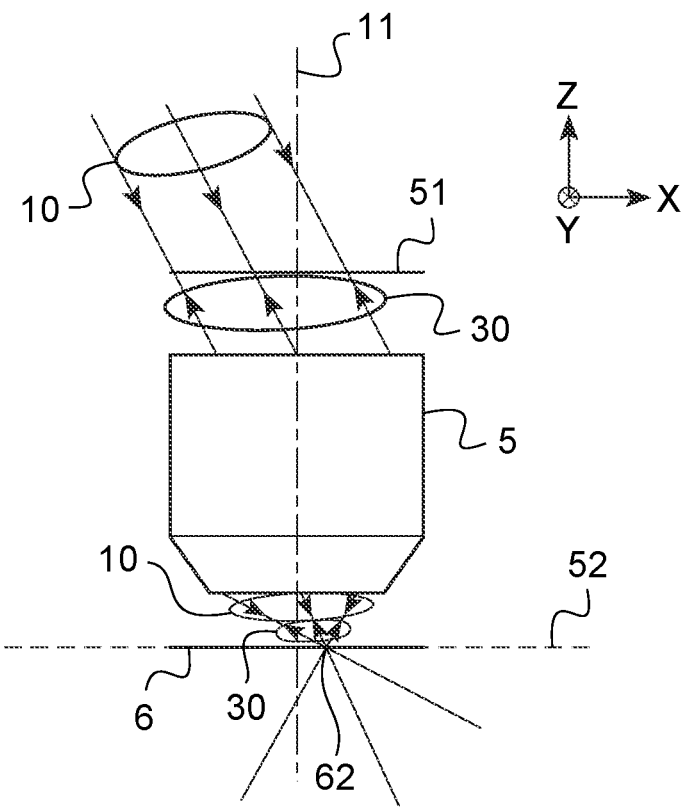
Figure 4:
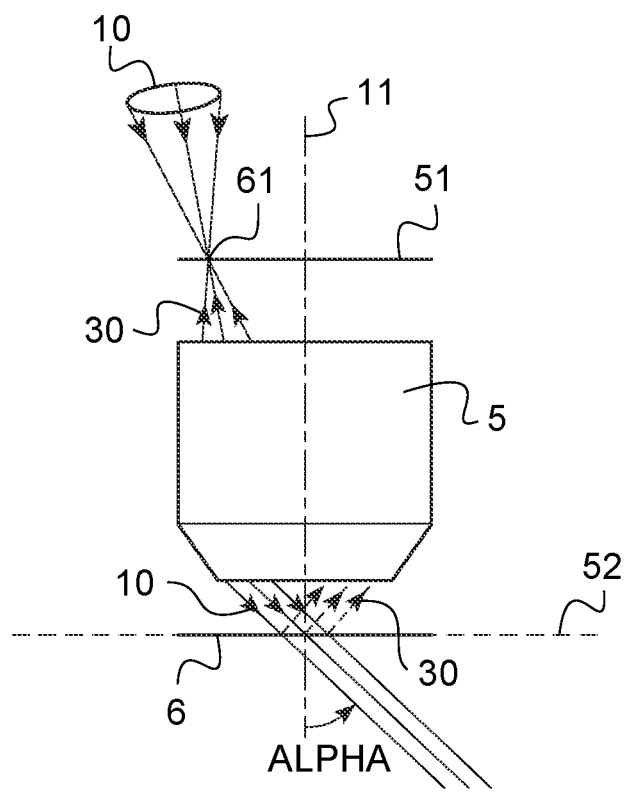
Figure 5:
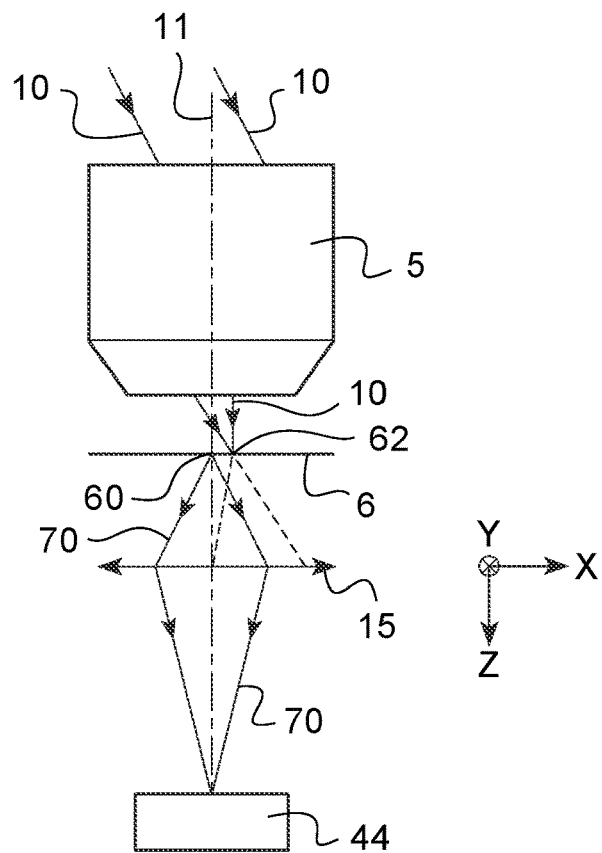
Figure 6:
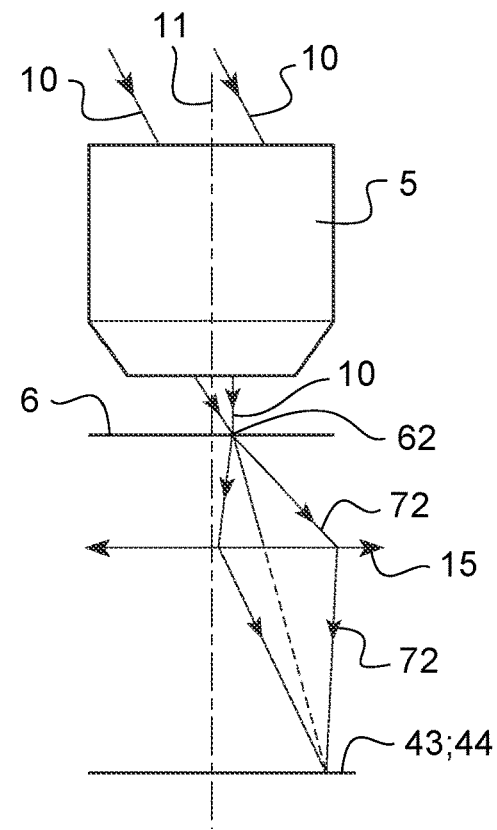
Figure 7:
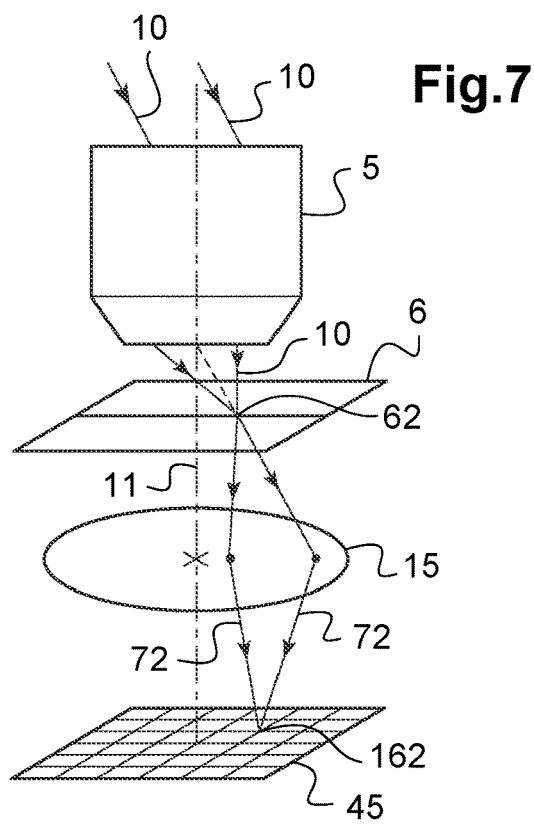
Figure 8:
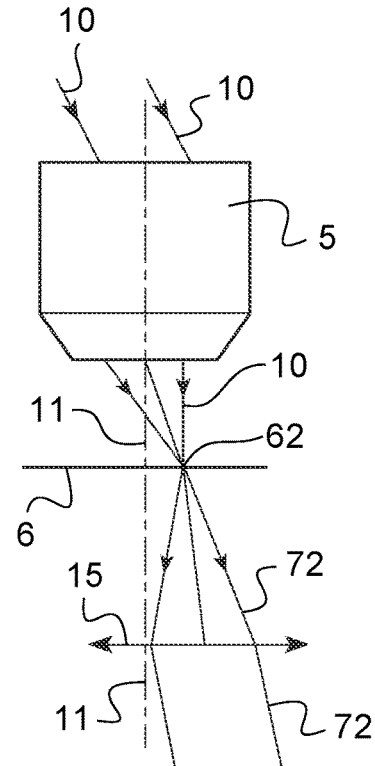
Figure 8:
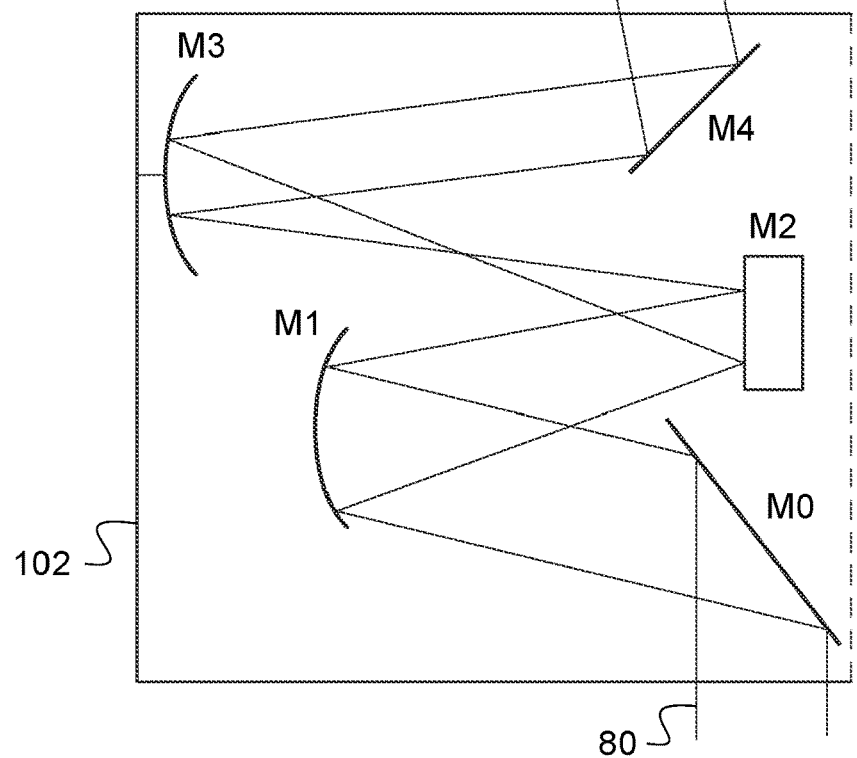

The following description in relation with the appended drawings, given by way of non-limitative examples, will allow a good understanding of what the invention consists of and of how it can be implemented. Moreover, various other features of the invention emerge from the appended description made with reference to the drawings that illustrate non-limitative embodiments of the invention, and in which:

FIG. 1 schematically shows a beam scanning system according to a first embodiment of the invention, FIG. 2 schematically shows a planar mirror mounted on a stage rotatable about two transverse axes of rotation, FIG. 3 shows an example of beam scanning in the image focal plane of the microscope objective, FIG. 4 shows another example of beam scanning in the object focal plane of the microscope objective, FIG. 5 illustrates an alternative of the first embodiment in which the beam scanning system is used for transmission measurements, FIG. 6 illustrates another alternative of the first embodiment in which the beam scanning system is combined with a spectrometer for transmission spectrometry measurements, FIG. 7 illustrates still another alternative of the first embodiment in which the beam scanning system is combined with a two-dimensional sensor for transmission measurements, FIG. 8 illustrates still another alternative of the first embodiment in which the beam scanning system is used both on the incident beam and on the transmitted beam, It is to be noted that, in these figures, the structural and/or functional elements common to the different alternatives can be denoted by the same references.

In FIG. 1, a beam scanning system 100 is shown, which is intended to be inserted between a light source 1 and a microscope objective 5.

A (XYZ) orthonormal reference system is shown. The plane of FIG. 2 is the (YZ) plane.

By way of non-limitative example, the microscope is of the confocal type and includes a confocal aperture 43. The confocal aperture 43 is arranged on a plane conjugated to the focal plane of the microscope objective 5. For example, the confocal aperture 43 is arranged in a plane at the focus of a lens 42.

The scanning system herein includes a first deflecting mirror M0, a first focusing mirror M1, a scanning mirror M2, a second focusing mirror M3 and a second deflecting mirror M4.

The deflecting mirrors M0 and M4 are planar mirrors. The deflecting mirrors M0 and M4 simply serve to fold the excitation light beam while keeping the optical alignment between the excitation light beam 10 and the microscope objective 5 along the main optical axis 11 of the microscope.

Advantageously, the beam scanning system 100 of FIG. 1 forms an optional module able to be inserted into and/or removed from the confocal part of the microscope, between a diaphragm 2 and the microscope objective 5. The excitation light beam 10 is collimated and propagates along a direction parallel to the Z-axis. Particularly advantageously, the insertion or removal of the optional module into or from the confocal part of the microscope does not modify the optical adjustment of the confocal microscope. The optional module can be inserted or removed according to the needs, without modifying the optical alignment of the light source 1, the confocal aperture 43 and the objective 5.

The first deflecting mirror M0 receives the collimated excitation light beam 10 and reflects it towards the first focusing mirror M1. By way of example, the first deflecting mirror M0 has a size of at least 15 mm×15 mm and a thickness of 6 mm.

Advantageously, the first deflecting mirror M0 is mounted on a conventional point-line-plane support with an access to the adjusting screws on the front face of the mirror M0. For a fine adjustment, an adjustment range of +/−1 degree is sufficient on two axes of rotation, for example an axis of rotation parallel to the X-axis and the other transverse to the X-axis. Advantageously, the first deflecting mirror M0 is adjustable in position over a depth of +/−1 mm along the normal to the deflecting mirror M0. The angle of incidence of the excitation light beam 10, with respect to the normal to the mirror M0, is preferably adjustable in a range between 51 degrees and 57 degrees, for example to a value of about 54 degrees. After reflection on the deflecting mirror M0, the excitation light beam 10 propagates along the optical axis 110.

The first focusing mirror M1 is preferably a toric or toroidal mirror. The first focusing mirror M1 has a first radius of curvature r1 about the Z-axis and a second radius of curvature r2 about the X-axis. The first focusing mirror M1 is for example of rectangular shape, with a size of at least 15 mm×10 mm and a thickness of 6 mm. The angle of incidence of the excitation light beam 10 with respect to the normal to the first focusing mirror M1 is of about 11 degrees. The first focusing mirror M1 has for effect to focus the excitation light beam 10 to a focal point in an intermediate focal plane 20 arranged transversally to the optical axis. Moreover, the toric shape of the first focusing mirror M1 is calculated and made in such a way as to correct the spherical aberrations induced by the mirrors M1 and M3 in the focal plane 6.

Advantageously, the first focusing mirror M1 is mounted on a conventional point-line-plane support with an access to the adjusting screws on the rear of the mirror M1. For a fine adjustment, an adjustment range of +/−1 degree is sufficient on two axes of rotation, for example an axis of rotation parallel to the X-axis and the other transverse to the X-axis. Advantageously, a fine adjustment in depth of +/−1.5 mm along the normal to the mirror is also available. Moreover, it is desirable that a rotation of the mirror M1 is available in order to adjust, coarsely and/or finely, the angle of incidence of the excitation light beam on the mirror M1 to a value comprised in the range of about 8 degrees to 14 degrees with respect to the optical axis 110.

According to an alternative, the first focusing mirror M1 is mounted to a translation guiding rail 31 oriented according to an axis perpendicular to the optical axis 11 (in the YZ-plane), in other words along the Y-axis. The movement of the first focusing mirror M1 on this guiding rail 31 makes it possible to adjust the distance between the first focusing mirror M1 and the main optical axis 11 of the microscope. By way of non-limitative example, a coarse adjustment of the depth of the mirror M1 makes it possible to adjust the position of the first focusing mirror M1 to a distance of about 50 mm (−17 mm/+33 mm) from the main optical axis 11 of the microscope.

The single scanning mirror M2 is arranged on the optical path of the excitation light beam 10 between the first focusing mirror M1 and the intermediate focal plane 20.

Hence, the first focusing mirror M1 receives the collimated excitation light beam 10 and reflects it towards the scanning mirror M2 while focusing the excitation light beam 10 to a focal point 21 in the intermediate focal plane 20.

FIG. 2 illustrates an example of scanning mirror M2 mounted on a stage 32 with two transverse axes of rotation 325, 326. The scanning mirror M2 is a planar mirror. The two axes of rotation 325, 326 are in the plane of the scanning mirror M2. For example, one of the axes of rotation 325 is and the other axis of rotation 326 is parallel to X-axis approximately parallel to Z-axis. Actuators 321, 322, 323, 324 make it possible to perform a rotation of the mirror M2 about the axis of rotation 325 and/or 326. According to a preferred embodiment, the actuators 321, 322, 323, 324 are of the piezoelectric or voice coil type.

The angle of incidence of the excitation light beam 10 on the scanning mirror M2 is preferably lower than or equal to 15 degrees, for example of about 8 degrees.

A rotation of the mirror M2 about the axis of rotation 325, parallel to the X-axis, has for effect to move the focal point 21 in the intermediate focal plane 20 towards another focal point 22, 23, 24 or 25 transversally to the X-axis. In first approximation, the focal points 21, 22, 23, 24 and 25 are located in the intermediate focal plane 20. Similarly, a rotation of the mirror M2 about the axis of rotation 326, parallel to the Z-axis, has for effect to move the focal point 21 in the intermediate focal plane 20 transversely to Z-axis. That way, the scanning mirror M2 makes it possible to move the focal point 21 in the intermediate focal plane 20 along two directions transverse to the intermediate focal plane. The first focusing mirror M1 is adapted to correct the spherical aberrations induced by the mirrors M1 and M3.

In the example illustrated in FIG. 1, when the mirror M2 focuses the light beam to the focal point 21, the incident light beam propagates along the optical axis 111. Similarly, when the mirror M2 focuses the light beam to the focal point 22, 23, 24 or 25, respectively, the incident light beam propagates along the optical axis 112, 113, 114 or 115, respectively.

The amplitude of rotation during a scanning of the mirror M2 is about 6 degrees about each axis of rotation.

The second focusing mirror M3 is preferably a spherical mirror. In the example illustrated in FIG. 1, the second focusing mirror M3 has a radius of curvature of 300 mm. The position and size of the second focusing mirror M3 are determined as a function of the aperture of the microscope objective 5 and of the scanning range of the mirror M2 in such a way as to limit the effects of vignetting of the light beam on the edges of the mirror M3. The angle of incidence of the excitation light beam 10 with respect to the normal to the second focusing mirror M3 is about 6 degrees. The second focusing mirror M3 makes it possible to collect the incident light beam reflected by the scanning mirror M2 regardless the position of the focal point in the intermediate focal plane during a scanning of the scanning mirror M2. The second focusing mirror M3 reflects the incident light beam towards the second deflecting mirror M4 and/or the microscope objective 5. As an alternative, the second focusing mirror M3 is a toric mirror. In this case, the mirror M1 corrects a part of the optical aberrations and the second focusing mirror M3 is adapted to correct the other part of the optical aberrations.

Advantageously, the second focusing mirror M3 is mounted on a conventional point-line-plane support with an access to the adjusting screws on the rear of the mirror M3. For a fine adjustment, an adjustment range of +/−1 degree is sufficient on two axes of rotation, for example an axis of rotation parallel to X-axis and the other transverse to X-axis. Advantageously, a fine adjustment in depth of +/−1.5 mm is also available. Moreover, it is desirable that a rotation of the mirror M3 is available in order to adjust, coarsely and/or finely, the angle of incident of the excitation light beam on the mirror M3 to a value comprised in the range of about 5.75 degrees to 7.5 degrees with respect to the optical axis 110.

According to an alternative, the second focusing mirror M3 is mounted on a translation guiding rail 33. The movement of the second focusing mirror M3 on this guiding rail 33 makes it possible to adjust the distance between the second focusing mirror M3 and the main optical axis 11 of the microscope. By way of non-limitative example, a coarse adjustment of the depth of the mirror M3 makes it possible to adjust the position of the second focusing mirror M3 to a distance of about 50 mm from the main optical axis 11 of the microscope.

The second focusing mirror M3 receives an incident beam focused to a point 21, 22, 23, 24 or 25 of the intermediate focal plane and reflects this light beam towards the second deflecting mirror M4 or directly towards the microscope objective 5 in the case where no deflecting mirror M4 is used.

The second focusing mirror M3 makes it possible to bring the image of the scanning mirror M2 back to the pupil of the microscope objective 5. The second focusing mirror M3 hence limits the effects of vignetting by the microscope objective 5 when the orientation of the scanning mirror M2 varies.

In the example illustrated in FIG. 1, the second deflecting mirror M4 receives an excitation light beam and reflects it towards the microscope objective 5. By way of example, the second deflecting mirror M4 has a rectangular shape of 30 mm×45 mm and a thickness of 6 mm.

Advantageously, the second deflecting mirror M4 is mounted on a conventional point-line-plane support with an access to the adjusting screws on the front face of the mirror M4. For a fine adjustment, an adjustment range of +/−1 degree is sufficient on two axes of rotation, for example an axis of rotation parallel to X-axis and the other transverse to X-axis. Advantageously, the second deflecting mirror M4 is adjustable in position over a depth of +/−1 mm along the normal to the deflecting mirror M4. The angle of incidence of an excitation light beam, with respect to the normal to the mirror M4, is variable as a function of the scanning of the mirror M2 in a range of a few degrees, according to the distance between the deflecting mirror M4 and the microscope objective 5. After reflection on the second deflecting mirror M4, the excitation light beam propagates with a variable angle with respect to the main optical axis 11 of the microscope objective 5, as a function of the tilt angle of the scanning mirror M2.

In a first embodiment, illustrated in FIGS. 1 and 3, the second focusing mirror M3 is arranged at a predetermined distance from the intermediate focal plane 20 in such a way as to receive the incident beam focused at a point 21, 22, 23, 24 or 25 of the intermediate focal plane and to form a collimated light beam. Hence, the microscope objective 5 receives a collimated light beam having a variable tilt as a function of the scanning of the mirror M2 about one or two axes of rotation transverse to the optical axis 11 of the microscope objective. The second focusing mirror M3 collimates the light beam coming from a point of the intermediate focal plane 20. The second deflecting mirror reflects the collimated beam towards the microscope objective 5. Hence, in the object focal point 51 of the microscope objective 5, the incident light beam remains collimated (see FIG. 3). The object focal plane 51 is also called rear focal plane. The microscope objective 5 focuses the incident light beam 10 to a point 62 of the image focal plane 52 of the microscope objective 5. The image focal plane 52 is also called front focal plane. Hence, the angular tilting of the scanning mirror M2 makes it possible to move the point 62 in the image focal plane 52 of the microscope objective 5 along the X and/or Y-directions. An area of the image focal plane 52 of the microscope can hence be scanned by modifying the tilt of a single scanning mirror M2, the other mirrors M0, M1, M2 and M3 remaining fixed.

In the first embodiment, the first focusing mirror M1 and the second focusing mirror M3 form an afocal optical system.

In short, in the first embodiment, the excitation light beam movement system 100 makes it possible to move the focusing point 62 in the front focal plane 52 along two spatial directions (X, Y) transverse to the optical axis 11 of the microscope objective.

The incident light beam 10 can be used as an excitation beam to generate a light beam by back-scattering, transmission or reflection.

A particularly interesting application relates to the fluorescence or the Raman scattering. In this case, the light source 1 is advantageously a laser source.

In a configuration of Raman back-scattering measurement, the microscope objective 5 collects a back-scattered or reflected light beam 30 formed by back-scattering or reflection of the excitation light beam 10 at a point 62 of a sample 6. The collected light beam 30 follows the reverse path of the excitation light beam by successive reflections on the mirrors M4, M3, M2, M1 and M0. An optical component 41, of the semi-reflecting plate or dichroic plate type, makes it possible to separate the excitation light beam 10 from the back-scattered or reflected light beam 30. In the case of a confocal microscope, the collected light beam 30 passes through the confocal aperture 43.

An optical component, for example a lens 42, focuses the back-scattered or reflected light beam 30 on the input slot of a spectrometer 44.

Hence, the beam scanning system 100 makes it possible to transform a confocal microscope into a beam-scanning fluorescence or Raman microscope, without modifying the optical adjustments of the confocal microscope.

In other applications of the first embodiment, illustrated in FIGS. 5 to 8, transmission measurements are performed in combination with the same excitation light beam movement system 100 as described hereinabove. The beam scanning system 100 arranged on the optical path of the excitation light beam 10 is not shown in FIGS. 5 to 8.

According to a first alternative, illustrated in FIG. 5, another objective 15 is used to collect a transmitted light beam 70. The movement system 100 makes it possible to move the focusing point 62 in the front focal plane 52 of the microscope objective along two directions transverse to the optical axis 11 of the microscope objective. In this alternative, the other objective 15 collects only a signal coming from a point 60 on the optical axis 11 at the centre of the field of the objective 15, regardless the position of the excitation point, in other words regardless the (X, Y) position of the focusing point 62. The objective 15 focuses the transmitted beam 70 on a spectrometer 44 or directly on a detector.

An application of this first alternative makes it possible, for example, to measure the propagation of a light beam in a planar waveguide. For that purpose, the waveguide is placed in the plane of the sample 6, an end of the waveguide is excited at an excitation point 62 located remote from the optical axis and the signal is collected by transmission at another end of the waveguide located on the optical axis 11.

Another application of this first alternative consists in measuring the entirety of the transmitted beam 70 in the field of the objective 5, by scanning rapidly the surface of the sample and by collecting the integrality of the transmitted beam 70 in order to have information integrated over the whole volume or the whole surface of the sample.

According to a second alternative, illustrated in FIG. 6, the other objective 15 is used to collect a transmitted light beam 72 coming from any focusing point 62. In a particular example of application of this second alternative, the excitation point 62 is moved along a single direction in the plane of the sample (for example, X or Y) and the transmitted beam 72 is collected along the length of the input slot of a spectrometer 44 as a function of the position of the excitation point 62 along the scanning direction.

According to a third alternative, illustrated in FIG. 7, the other objective 15 is used to collect the transmitted light beam 72 coming from an excitation point 62 and to form the image of transmitted beam 72 on a two-dimensional matrix sensor 45. By moving the excitation point 62 on the sample in the XY-plane, an image of the sample is hence formed by transmission as a function of the excitation point 62. This alternative applies in particular to the confocal microscopy intensity measurement, for example by transmission measurement on the sample at each point, or hyperspectral microscopy measurement using a hyperspectral camera. To obtain spectral information, it is advisable to add a filter in order to select a particular spectral band. This filter can have a fixed spectral band and be replaced by another filter to change the spectral range. As an alternative, the filter is a tunable bandpass filter.

According to a fourth alternative, illustrated in FIG. 8, a second beam scanning system 102 is used, arranged on the optical path of the transmitted beam 72, which is here collimated by the other objective 15. The second beam scanning system 102 includes optical components M4, M3, M2, M1 and M0 similar to those of the beam scanning system 100 arranged on the optical path of the excitation light beam 10. Moreover, the two scanning mirrors M2 of the two beam scanning systems 100 and 102 are synchronized. At the output of the second beam scanning system 102, the transmitted beam 80 has a fixed direction, regardless the position of the excitation point 62 in the XY-plane of the sample. The transmitted beam 80 is then sent on a spectrometer or a detector.

In a second embodiment, illustrated in FIG. 4, the second focusing mirror M3 is arranged at a predetermined distance from the intermediate focal plane 20 so as to receive the excitation light beam 10 focused at one point 21, 22, 23, 24 or 25 of the intermediate focal plane 20 and to form a light beam focused at one point 61 in the object focal plane 51 of the microscope objective 5. The variable tilt about two axes of rotation of the scanning mirror M2 makes it possible to modify the XY-position of the point 61 in the object focal plane 51. Hence, the microscope objective 5 receives a focused light beam and forms a collimated light beam in the image focal plane 52, having a variable tilt as a function of the scanning of the mirror M2 about one or two axes of rotation transversally to the optical axis 11 of the microscope objective. In other words, the second focusing mirror M3 forms an image of the intermediate focal plane 20 in the object focal plane 51 of the microscope objective 5. The second deflecting mirror M4 reflects the collimated beam towards the microscope objective 5. Therefore, in the object focal plane 51 of the microscope objective 5, the incident light beam is focused (see FIG. 4). The microscope objective 5 collimates the incident light beam 10 in the image focal plane 52 of the microscope objective 5. Hence, the angular tilt of the scanning mirror M2 makes it possible to adjust and/or modify the tilt angle ALPHA of the excitation light beam 10 in the image focal plane 52 of the microscope objective 5 with respect to two axes of rotation transverse to the main optical axis 11.

The tilt angle ALPHA of the excitation light beam in the image focal plane 52 of the microscope can hence be adjusted by adjusting the tilt of a single scanning mirror M2, the other mirrors M0, M1, M2 and M3 remaining fixed. The microscope objective 5 collects a light beam 30 reflected or back-scattered on the sample 6.

In the second embodiment, the first focusing mirror M1, the second focusing mirror M3 and the microscope objective 5 form an afocal optical system.

In the second embodiment, the excitation light beam movement system 100 makes it possible to adjust or scan the tilt angle ALPHA of the collimated excitation light beam in the front focal plane 52 about two axes of rotation transverse to the optical axis 11 of the microscope objective.

In this second embodiment, the beam diameter at the output of the objective 5 depends mainly on the beam diameter (for example, 4 mm) at the input of the beam scanning system 100, on the distance between the mirror M3 and the intermediate focal plane 20 (for example, about 200 mm) and on the objective magnification (for example, 100×). In this example, the beam diameter at the output of the objective 5 is of about 20 µm, which determines the XY lateral spatial resolution. On the other hand, this allows an extreme axial resolution along the Z-axis for the TIRF or TIRR modes.

In an application of the second embodiment, the microscope objective 5 is a Total Internal Reflection Fluorescence (TIRF) objective. Similarly to the first embodiment, the microscope is hence adapted to perform total internal reflection fluorescence measurements in the sample 6 under a determined angle of incidence ALPHA. In another application, the microscope objective 5 is a Total Internal Reflection Raman (TIRR) objective. The microscope is hence adapted to perform total internal reflection Raman spectrometry measurements in the sample 6 under a determined angle of incidence ALPHA as a function of the optical index of the sample in order to obtain the total internal reflection.

According to another alternative, the tilt of the scanning mirror M2 is controlled in such a way as to adjust or scan the tilt angle ALPHA of the excitation light beam in the image focal plane 52 of the microscope, the other mirrors M0, M1, M2 and M3 remaining fixed. In another application, the microscope objective 5 collects a light beam reflected on the sample 6. The microscope is hence adapted to perform ellipsometric measurements under a determined angle of incidence ALPHA or as a function of the angle of incidence ALPHA in an angular range determined as a function of the numerical aperture of the microscope objective 5. For example, the angular range of the angle ALPHA extends from about 0 to 72 degrees for a microscope objective 5 having an numerical aperture of about 0.95. Advantageously, in the ellipsometry application, the light source 1 is chosen among a monochromatic or polychromatic source for measurements at one or several determined wavelengths or a wide-spectrum source for spectroscopic measurements.

According to a particular embodiment, the deflecting mirrors M0 and/or M4 can be omitted. In this case, the optical axis of the incident light beam is generally deviated by the optical system formed by the first focusing mirror M1, the scanning mirror M2 and the second focusing mirror M3.

According to an alternative of any one of the above-described embodiments, the first focusing mirror M1 is replaced by a first lens-based focusing optical system L1. Particularly advantageously, the first lens-based focusing optical system L1 is preferably corrected from the spherical aberrations in the intermediate focal plane 20.

As an alternative or complementarily, the second focusing mirror M3 is replaced by a second lens-based focusing optical system L3 arranged between the scanning mirror M2 and the microscope objective 5. The second lens-based focusing optical system L3 can be used in combination with a mirror M1 or a lens-based optical system L1.

A movement system 100 combined with a microscope objective 5 according to the first embodiment can be used to position the measurement point 62 to a determined point of the front focal plane, for example on a sample 6. The excitation beam forms a light spot 62 adapted to be moved and precisely positioned in the front focal plane of the microscope objective as a function of the tilt of the scanning mirror M2 about one or two axes of rotation. Moreover, by inverse return of light, the movement system 100 is adapted for a confocal collection of the reflected or back-scattered signal.

According to a particular embodiment, comprising a particle finder system, based for example on an image capturing and processing system, the position of one or several particles on a sample surface is previously located and the measurement point 62 is automatically positioned on each particle in order to measure them one by one.

In an so-called microspot application, a mapping of the sample is made for different positions of the measurement point 62 as a function of a series of variable tilting angles (according to one or two directions) of the scanning mirror M2, with a spatial microscopic resolution. In this application, each measurement is performed between two successive movements. Consequently, the control of the scanning mirror requires multiple starts and stops, which implies a relatively high total duration of acquisition.

The movement system 100 is also adapted to perform a series of measurements at a series of predetermined instants, during a continuous or almost-continuous movement of the spot on the sample, in order to limit the down times between two consecutive measurements. This on-the-fly measuring method (or SWIFT mode) makes it possible to obtain spatially resolved measurements more rapidly than with the microspot mode.

In another so-called macrospot application, the signal detected during a movement of the spot 62 on the sample is integrated in such a way as to obtain a spatially-averaged measurement on a surface of greater size than the laser spot 62. The shape of the macrospot can be predetermined, for example disk, ring, square, rectangle, or adapted to the shape of the object considered, for example a biological form detected by an imaging system.

According to another alternative, the measurement is acquired by moving the measurement point 62 along a line on the sample, and the image of this line is formed in the longitudinal direction of the input slot of the spectrometer 44. The spectrometer being provided with a sensor of the two-dimensional camera type, a series of spectra along a line on the sample is hence very rapidly obtained.

A movement system 100 combined with a microscope objective 5 according to the second embodiment is adapted to light a sample with a collimated excitation light beam under a predetermined angle of incidence ALPHA in the front focal plane. Particularly advantageously, the same microscope objective 5 and the movement system 100 are used to collect a light beam formed by reflection of the excitation beam on the sample, the reflected beam forming an angle that is symmetrical to the angle ALPHA with respect to the optical axis 11 of the microscope objective. The movement system 100 according to the second embodiment finds applications in the total internal reflection fluorescence (TIRF) micro-spectrometry or the total internal reflection Raman (TIRR) micro-spectrometry or also ellipsometry.

The movement system 100 according to the second embodiment is also adapted to light a sample with a collimated excitation light beam under a variable angle of incidence ALPHA, in order to determine the angle of incidence ALPHA making it possible to obtain the greatest sensitivity for measurements of the TIRF, TIRR or ellipsometry type.

Of course, various other modifications can be added to the invention within the framework of the appended claims.

The invention claimed is:

1. A light-beam scanning micro-spectrometry device comprising at least one light source (1) adapted to emit an excitation light beam (10), a microscope objective (5) arranged along a main optical axis (11) of the micro-spectrometry device, the microscope objective (5) having an object focal plane (51) and an image focal plane (52), a system (100) for moving the excitation light beam along two spatial directions (X, Y) transverse to an optical axis of the beam, the microscope objective (5) and the movement system (100) being adapted to move the excitation light beam (10) on a sample and an optical system (5, 15) adapted to collect a light beam (30, 70, 72) formed by reflection, scattering or transmission of the excitation light beam (10) on the sample, and a spectrometric detection system adapted to receive the light beam (30, 70, 72) formed by reflection, scattering or transmission, wherein the excitation light beam movement system (10) comprises: a first focusing optical component (M1, L1) adapted to receive and focus the excitation light beam (10) to a focusing point (21) in an intermediate focal plane (20), another focusing optical component (M3, L3) arranged on an optical path of the beam between the intermediate focal plane (20) and the microscope objective (5), the other focusing optical component (M3, L3) being adapted to form an image of the intermediate focal plane (20) in the object focal plane (51) or, respectively, in the image focal plane (52) of the microscope objective (5), and a single scanning mirror (M2) arranged on the optical path of the excitation light beam between the first focusing optical component (M1, L1) and the intermediate focal plane (20), the scanning mirror (M2) being planar and mounted on a stage rotatable about two transverse axes of rotation, the two axes of rotation being in a plane of the scanning mirror (M2), the scanning mirror (M2) being adapted to move the focusing point (21) along two transverse directions in the intermediate focal plane (20) in such a way as to move an image of the focusing point (61, 62) along two transverse directions in the object focal plane (51) or, respectively, in the image focal plane (52) of the microscope objective (5).

2. The light-beam scanning micro-spectrometry device according to claim 1, wherein the first focusing optical component (M1, L1) is a toric mirror.

3. The light-beam scanning micro-spectrometry device according to claim 2, wherein the toric mirror (M1) is adapted to reduce reduce geometrical optical aberrations in the intermediate focal plane (20).

4. The light-beam scanning micro-spectrometry device according to claim 1, wherein the first focusing optical component (M1, L1) includes at least one lens.

5. The light-beam scanning micro-spectrometry device according to claim 1, wherein the first focusing optical component (M1, L1) is mounted on a guiding rail (31) adapted to adjust a distance between the first focusing optical component (M1, L1) and the microscope objective (5).

6. The light-beam scanning micro-spectrometry device according to claim 1, wherein the other focusing optical component (M3, L3) is a spherical mirror, a toric mirror or a lens.

7. The light-beam scanning micro-spectrometry device according to claim 1, wherein the other focusing optical component (M3, L3) is mounted on another guiding rail (33) adapted to adjust a distance between the other focusing optical component (M3, L3) and the microscope objective (5).

8. The light-beam scanning micro-spectrometry device according to claim 1, wherein the scanning mirror (M2) is arranged in such a way as to receive the excitation light beam (10) under an angle of incidence lower than or equal to 15 degrees.

9. The light-beam scanning micro-spectrometry device according to claim 1, further including a first planar deflecting mirror (M0) or another planar deflecting mirror (M4), the first planar deflecting mirror (M0) being arranged upstream from the first focusing optical component (M1, L1) or, respectively, the other planar deflecting mirror (M4) being arranged between the other focusing optical component (M3, L3) and the microscope objective (5).

10. The light-beam scanning micro-spectrometry device according to claim 1, wherein the rotatable stage includes a two-axis-of-rotation actuator (25) of piezoelectric or voice coil type.

11. The light-beam scanning micro-spectrometry device according to claim 1, wherein said at least one light source (1) comprises one or several sources of the laser source or light-emitting diode type.

12. The light-beam scanning micro-spectrometry device according to claim 1, wherein the micro-spectrometry device includes a confocal aperture (43) arranged upstream of the first focusing optical component (M1, L1), the excitation light beam (10) incident on the first focusing optical component (M1, L1) being collimated.

13. The light-beam scanning micro-spectrometry device according to claim 1, wherein the spectrometric detection system includes a Raman spectrometer, a coherent anti-Stokes Raman spectrometer, a fluorescence spectrometer, a photoluminescence spectrometer, a cathodoluminescence spectrometer, a hyperspectral camera, a spectral filter or a tunable bandpass filter.

14. The light-beam scanning micro-spectrometry device according to claim 1, wherein the microscope objective is a total internal reflection objective and wherein the other focusing optical component (M3, L3) is adapted to form an image of the intermediate focal plane (20) in the object focal plane of the total internal reflection objective, in such a way as to angularly move the collimated excitation light beam in the image focal plane (52) and to collect a total internal reflection light beam on the sample.

15. A method of light-beam scanning micro-spectrometry comprising the following steps: emitting an excitation light beam (10) by means of a light source;
   directing the excitation light beam towards a first focusing optical component (M1, L1) and reflecting the excitation light beam on a single planar scanning mirror (M2), in such a way as to focus the excitation light beam (10) to a focusing point (21) in an intermediate focal plane (20) after reflection of the excitation light beam on the scanning mirror (M2), directing the excitation light beam towards another focusing optical component (M3, L3) then a microscope objective (5), in such a way as to form an image of the intermediate focal plane (20) in an object focal plane (51) or, respectively, in an image focal plane (52) of the microscope objective (5), and tilting the scanning mirror (M2) about two transverse axes of rotation to move the focusing point (21) along two transverse directions in the intermediate focal plane (20), in such a way as to move an image of the focusing point (61, 62) along two transverse directions in the object focal plane (51) or, respectively, in the image focal plane (52) of the microscope objective (5); collecting a light beam (30, 70, 72) formed by reflection, scattering or transmission of the excitation light beam, and receiving the light beam (30, 70, 72) formed by reflection, scattering or transmission on a spectrometric detection system.

16. The light-beam scanning micro-spectrometry device according to claim 2, wherein the other focusing optical component (M3, L3) is a spherical mirror, a toric mirror or a lens.

17. The light-beam scanning micro-spectrometry device according to claim 6, wherein the other focusing optical component (M3, L3) mounted on another guiding rail (33) adapted to adjust a distance between the other focusing optical component (M3, L3) and the microscope objective (5).

18. The light-beam scanning micro-spectrometry device according to claim 2, wherein the scanning mirror (M2) is arranged in such a way as to receive the excitation light beam (10) under an angle of incidence lower than or equal to 15 degrees.

19. The light-beam scanning micro-spectrometry device according to claim 2, further including a first planar deflecting mirror (M0) or another planar deflecting mirror (M4), the planar deflecting mirror (MO) being arranged upstream from the first focusing optical component (M1, L1) or, respectively, the other planar deflecting mirror (M4) being arranged between the other focusing optical component (M3, L3) and the microscope objective (5).

20. The light-beam scanning micro-spectrometry device according to claim 2, wherein the rotatable stage includes a two-axis-of-rotation actuator (25) of piezoelectric or voice coil type.

* * * * *